(12) United States Patent
Michael (10) Patent No.: US 7,899,997 B2
(45) Date of Patent: Mar. 1, 2011

(54) SYSTEMS AND METHODS FOR IMPLEMENTING KEY-BASED TRANSACTIONAL MEMORY CONFLICT DETECTION

(75) Inventor: Maged M. Michael, Danbury, CT (US)

(73) Assignee: International Business Machines Corporation, Armonk, NY (US)

(*) Notice: Subject to any disclaimer, the term of this patent is extended or adjusted under 35 U.S.C. 154(b) by 527 days.

(21) Appl. No.: 12/046,764

(22) Filed: Mar. 12, 2008

(65) Prior Publication Data

US 2009/0235254 A1    Sep. 17, 2009

(51) Int. Cl.
*G06F 9/46* (2006.01)

(52) U.S. Cl. ...................................... 711/150
(58) Field of Classification Search ................. None
See application file for complete search history.

(56) References Cited

U.S. PATENT DOCUMENTS

| 7,328,316 | B2* | 2/2008 | Moir et al. ............ 711/150 |
| 2004/0015642 | A1* | 1/2004 | Moir et al. ............ 711/1 |

* cited by examiner

*Primary Examiner*—Kevin Verbrugge
(74) *Attorney, Agent, or Firm*—Tutunjiian & Bitetto, P.C.; Brian P. Verminski, Esq.

(57) ABSTRACT

Transactional memory systems and methods are provided which employ key-based transactional memory conflict detection mechanisms for enabling low-overhead conflict detection at variable granularities using customizable conflict sets that are designated using key values.

23 Claims, 5 Drawing Sheets

SYSTEMS AND METHODS FOR IMPLEMENTING KEY-BASED TRANSACTIONAL MEMORY CONFLICT DETECTION

TECHNICAL FIELD

Embodiments of the invention relate to the field of transactional memory systems and transactional memory execution. More particularly, embodiments of the invention relate to transactional memory systems and methods employing key-based transactional memory conflict detection mechanisms which utilize customizable conflict sets for enabling low-overhead conflict detection at variable granularities.

BACKGROUND

In general, strong market demand for computing systems with faster processing speeds has been met by technical innovations in multicore, multithreaded processor chips and the development of parallel programming methodologies to support concurrent access to shared resources. In particular, transactional memory makes it easier to write parallel programs and allow different threads to be processed simultaneously thereby gaining extremely high processing efficiencies. Transactional memory programming techniques allow transactions that do not overlap in data accesses to run uninterrupted in parallel. For purposes of data consistency in transactional programming, certain sections of the program have to execute atomically, whereby transactional memory systems and methods allow programs to read and modify memory locations as a single atomic operation. Such sections specified by the programmer as atomic are often called atomic sections, atomic transactions, or transactions for short.

In particular, a transaction is a finite sequence of steps (program instructions) executed by a single thread, including memory reads and writes access operations. A transaction may execute serially such that the steps of one transaction do not interleave with the steps of another. TM systems provide a mechanism for guaranteeing the atomicity of atomic sections by guaranteeing that these memory accesses appear to an external observer take effect all at once, i.e., in one atomic step, where a transaction either commits or aborts.

One of the main functions of TM systems is the detection of conflicts among concurrent transactions. Conflict detection is the process of identifying when two or more transactions conflict. Multiple transactions can be executed concurrently if they are not in conflict. Two transactions are said to be in conflict if they access the same memory location and at least one of the accesses is a write. Conflicts can exist when a transaction writes to memory that another transaction then reads or writes (write after write, write after read), or when a transaction reads memory that is then used in another transaction's write (read after write). Unlimited readers, on the other hand, can read the same piece of memory without any conflict (read after read).

Figure 1:
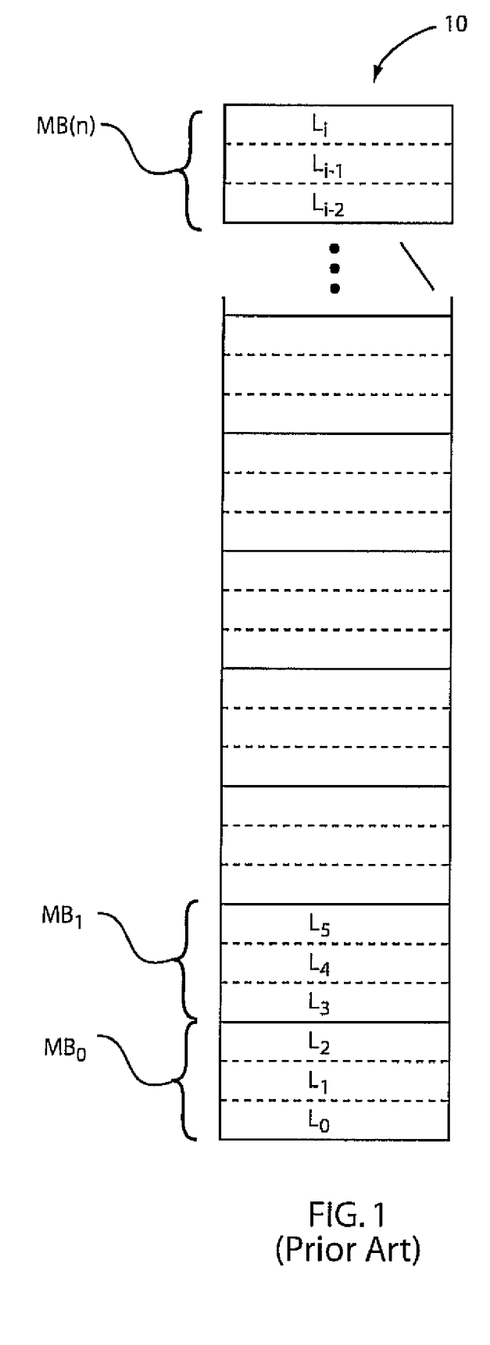
FIG. 1 schematically illustrates transactional memory in a conventional TM system that implements conflict detection at memory block level granularity.
Figure 2:
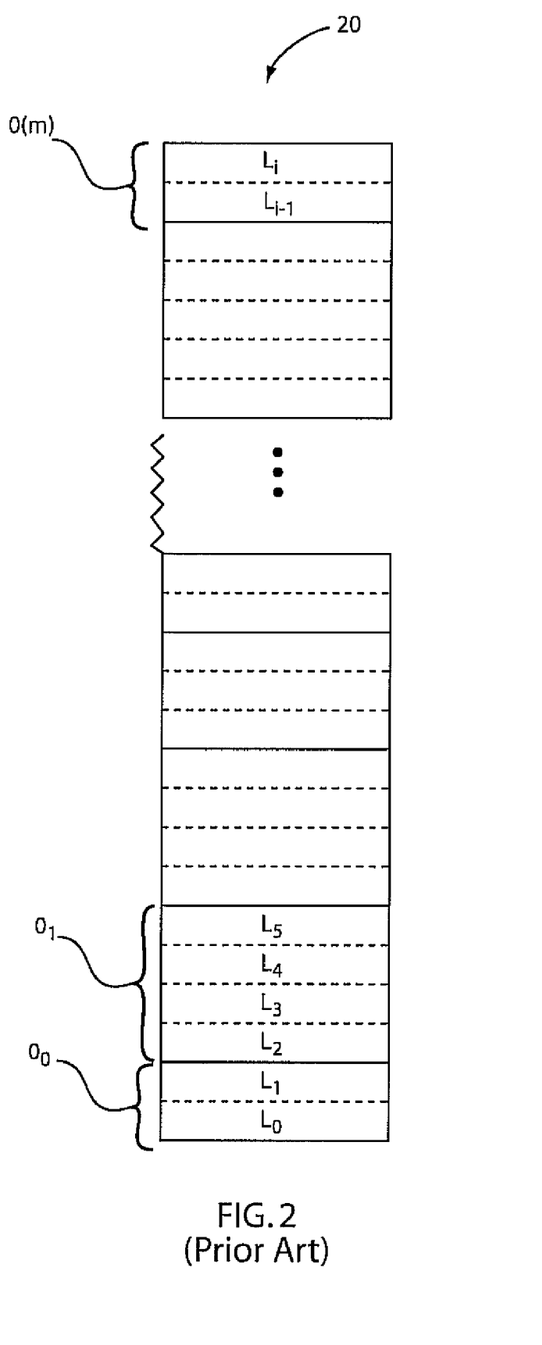
FIG. 2 schematically illustrates a transactional memory in a conventional TM system that implements conflict detection at object level granularity.

A problem that designers of TM systems face is the choice of the unit of conflict detection (whether based on fixed-size blocks of memory or data objects). TM systems use a memory granularity size of either word (block) or object for transactions. Word (block) memory granularity allows transactions to read and write at the machine's architectural word size. Object memory granularity allows transactions to read and write at the object level. For example. FIG. 1 schematically illustrates transactional memory (10) for a conventional TM system that implements conflict detection at memory block granularity. FIG. 2 schematically illustrates a transactional memory (20) for a conventional TIM system that implements conflict detection as object granularity.

In FIG. 1, the transactional memory (10) comprises a plurality of contiguous memory locations [L0, L1 . . . L9$i$-1), L(i)] in which the memory locations are divided into blocks [$MB_0$, $MB_1$, . . . MB(n)] of memory comprising 3 contiguous memory locations that are accessed by transactions as a memory access unit and where the conflict detection granularity is at the block level. In FIG. 2, the transactional memory (20) comprises a plurality of contiguous memory locations [L0, L1 . . . L($i$-1), L(i)] in which the memory locations include objects [$O_0$, $O_1$, . . . O(m)], each containing one or more contiguous memory locations that are accessed by transactions as a memory access unit. An object corresponds to a data unit as usually defined in an object-oriented programming language and occupies some number of memory locations.

In conventional TM systems such as depicted in FIGS. 1 and 2, conflict detection unit granularity is typically the same as the memory access unit (e.g., memory word or object). In general, object granularity conflict detection will identify a conflict between two transactions that access the same object if at least one transaction writes a field of the object, even if the two transactions access disjoint fields of the object. In this regard, object granularity conflict detection may therefore limit concurrency on large objects. For example, in a conventional TM system, a conflict is deemed to exist when a transaction writes to an element of an object and one or more other transactions access disjoint elements of the object. On the other hand, depending on the block size, conflict detection at a word (block)-based granularity may allow for conflict detection at finer grain concurrency by allowing concurrent access to different fields of the same object, but will have higher overhead due to a conflict detection evaluation that must be performed at each memory access.

If the unit of conflict detection is large, it is likely that two transactions that do not have inherent conflicts are mistakenly considered by the TM system to be in conflict simply because they access different parts of the same conflict unit. While this does not violate the safety guarantees of TM systems, it reduces performance by reducing concurrency unnecessarily, as in such a case at least one of these transactions need to be delayed or restarted. On the other hand, if the unit of conflict detection is small, this increases the record keeping overheads in time as well as space. These overheads are unnecessary if adjacent locations are always accessed together in the same transaction. Furthermore, if non-adjacent locations are accessed together in the same transactions but rarely in different transactions, where it would be beneficial to have these locations in the same conflict unit, existing TM systems are unable to exploit this possibility.

SUMMARY OF THE INVENTION

Exemplary embodiments of the invention generally include transactional memory systems and transactional memory execution. More particularly, embodiments of the invention relate to transactional memory systems and methods employing key-based transactional memory conflict detection mechanisms which utilize customizable conflict sets that are designated using key values, for enabling low-overhead conflict detection at variable granularities.

In one exemplary embodiment of the invention, the computing system includes a shared memory having a plurality of memory locations to store data that is shared among a plurality of threads, and a transactional memory system to control and coordinate concurrent access to the shared data in the memory by the threads executing concurrent transactions. The transactional memory system implements conflict detection at a variable granularity through customized conflict sets for transactions, wherein the customized conflict set for a given transaction includes a logical grouping of one or more memory locations in the shared memory that contain data to be accessed within the transaction.

In various exemplary embodiments of the invention, a conflict set for a given transaction may be specified by program level constructs or a conflict set may be dynamically determined during runtime by a compiler based on anticipated access patterns of the transaction. A conflict set for a given transaction may be specified by associating a logical key value to each memory location in the shared memory that may be accessed within the given transaction, or a conflict set for a given transaction may be dynamically specified to include memory locations in the shared memory that include variables to be accessed within the given transaction at a given time.

Furthermore, a conflict set for a given transaction may include non-contiguous memory locations in the shared memory and/or may include memory locations associated with two or more memory access units.

In one exemplary embodiment of the invention, a unique logical key is associated with each conflict set. The unique logical key for a given conflict set may be determined based on an address of a memory location included in the conflict set. The unique logical key may be passed as a parameter during initiation of a transactional memory access operation.

In accordance with exemplary embodiments of the invention, by implementing a key-based transaction memory conflict detection mechanisms, for a transaction with more than one access to memory locations of a conflict set, conflict detection can be performed for only one access operation and not performed for remaining access operations within the transaction. In other embodiments, multiple threads may concurrently access disjoint elements of a shared object, for example, when the memory accesses involve non overlapping data accesses as determined based on the conflict sets associated with the each of concurrent executing transactions.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary embodiments of transactional memory systems and methods employing conflict detection using customizable conflict sets will now be discussed in further detail with reference to FIGS. 3, 4 and 5, for example. As discussed below, transactional memory systems according to exemplary embodiments of the invention support conflict detection with conflict set granularities that are arbitrarily customizable to match program access patterns of transactions for enabling low-overhead conflict detection. In one embodiment, a transactional memory system can logically group a plurality of memory locations into conflict sets that are arbitrarily sized and may include groups of non-contiguous memory locations. In one preferred embodiment, conflict units are designated as customizable sets by associating a logical key value with each memory location that may be accessed by transactions. The key values are selected (by the programmer or the compiler) to indicate that locations with the same key value are bundled in the same conflict set. This enables the avoidance of unnecessary overheads and false conflicts.

Figure 3:
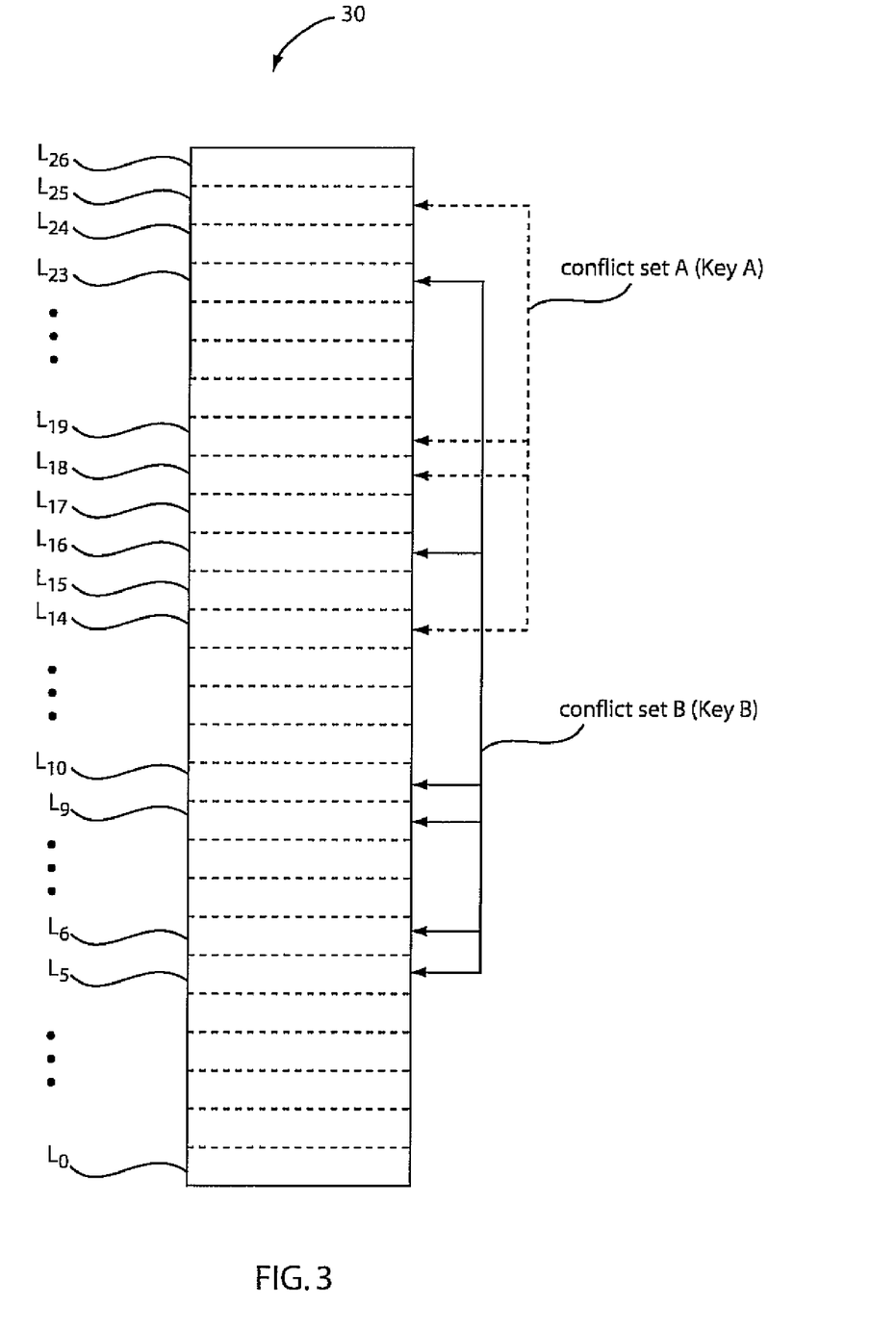
FIG. 3 schematically illustrates a method for performing key-based transactional memory conflict detection with customizable conflict sets, according to an exemplary embodiment of the invention.

FIG. 3 is a schematic diagram conceptually illustrates a method for implementing conflict detection for transactional accesses to memory (30) using customizable conflict sets for conflict detection. FIG. 3 illustrates a memory (30) having a plurality of memory locations (L0~L26) system with certain memory locations partitioned into variable sized conflict sets. For instance, a first conflict set A includes 4 memory locations $L_{14}$, $L_{18}$, $L_{19}$, and $L_{25}$ designated by a logical key "Key A", and a second conflict set B includes 6 memory locations $L_5$, $L_6$, $L_9$, $L_{10}$, $L_{16}$ and $L_{23}$, designated by a logical key "Key B". The memory (30) may include objects or data that is shared amount a plurality of threads in multithread computing environment wherein transactions can access objects or memory blocks for read or write operations. As depicted in FIG. 3, conflicts sets A and B can be distinguished from each other by associating key values A and B with respective conflict sets. These keys are logical and need not be stored with the memory locations of the conflict sets, wherein memory locations are mapped to keys in a table, etc.

In one exemplary embodiment of the invention, customizable conflict sets can be designed using logical keys, wherein a key associated with a conflict set can be passed as an additional argument to calls to transactional read and write operations. In other words, an argument can be added to each transactional access to a memory location, which argument is the logical key of the conflict set to which the memory location belongs. One method of selecting distinct keys for different conflict sets is to use the address of one of the memory locations in the conflict set as its logical key.

The TM system can then detect a conflict between two transactions if the both transactions access memory locations that belong to the same conflict set and at least one of these accesses is a write. Moreover, if a transaction involves accesses to multiple locations in the same conflict set, it is possible to eliminate costly overheads with all but one of the accesses. The following examples will demonstrate the use of logical keys to designate customizable conflict sets for implementing transactional memory conflict detection with reduced overheads and avoiding false conflicts.

Example 1

Consider the following example generic programming code of an atomic transaction, which includes instructions for performing first and second read operations to access variables x and y, respectively:

```
atomic {
    read x;
    read y;
}
```

In this example, it is assumed that each variable x and y are stored in memory locations that are associated with different memory access units (e.g., different memory blocks or objects). For example, as shown in FIG. 4A, the variable x is stored in memory location $L_{19}$ which is part of a memory access unit $U_1$ (word or object) containing locations $L_{17}$~$L_{20}$ in the memory (40), and variable y is stored in memory location $L_{10}$ which is part of a memory access unit $U_2$ containing locations $L_8$~$L_{12}$. In a conventional transactional memory system in which the memory locations associated with x and y belong to different memory access units as shown in FIG. 4A, the transaction would execute as follows:
   tm read full x
   tm read full y
where it is assumed that the operation "tm read" represents a transaction read step that incurs the full overhead of a transactional read for the given programming environment and application. The transaction would first access the memory access unit U1 using a full transaction read to access the memory location and read the variable x, and then access the memory access unit U2 using a full transactional access and read the variable y.

Figure 4A:
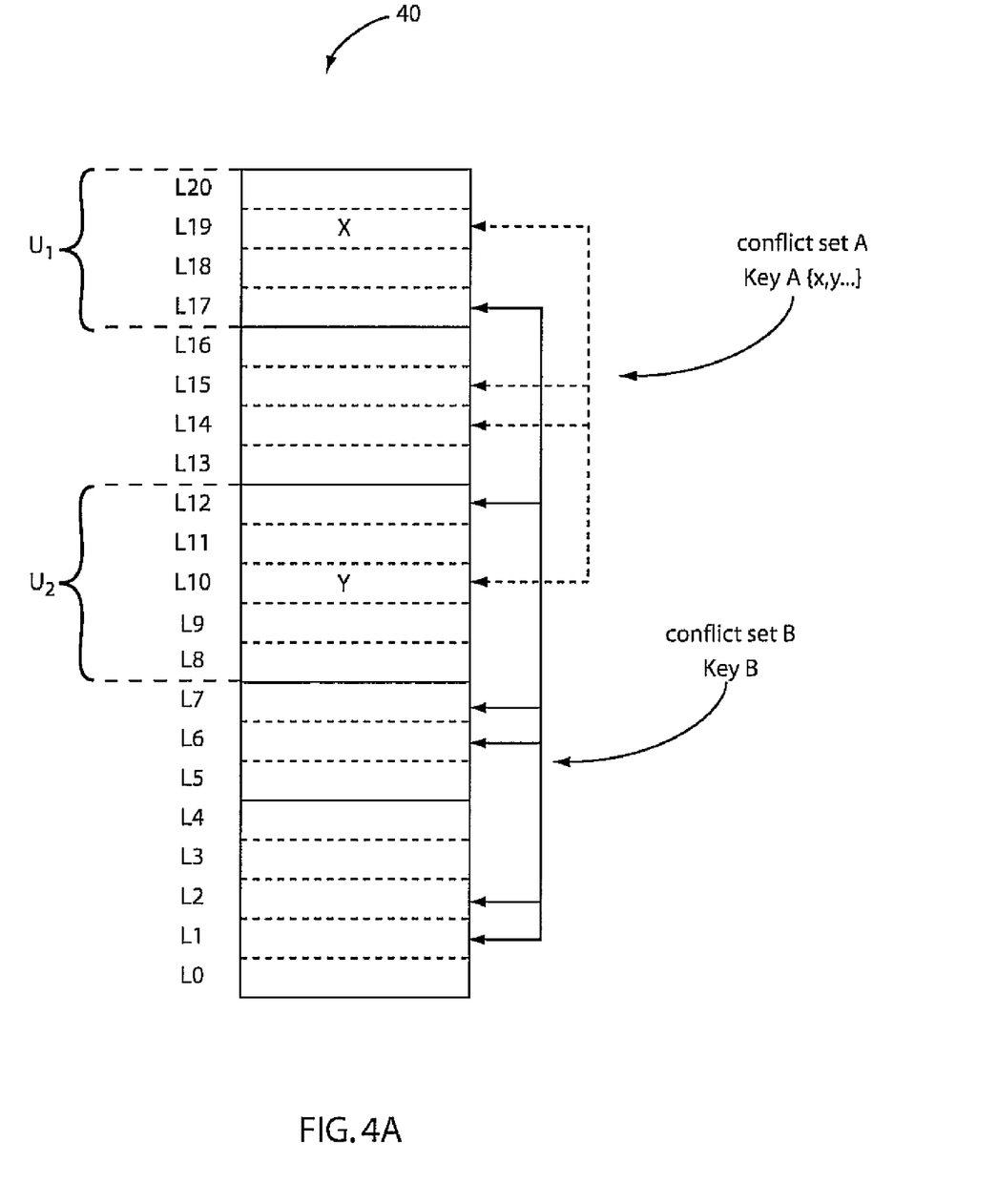
FIGS. 4A and 4B schematically illustrate examples methods for performing key-based transactional memory conflict detection with customizable conflict sets, according to exemplary embodiments of the invention.

In accordance with an exemplary embodiment of the invention, the overhead associated with conflict detection in the example of FIG. 4A can be reduced using conflict sets to control access to the shared memory (40). For example, assume that the programmer (or the compiler) determines that memory locations associated with the variables x and y in the shared memory (40) are typically accessed in the same transaction and rarely accessed in different transaction, conflict detection overhead can be reduced by assigning the variables x and y to the same conflict set. For instance, as shown in FIG. 4A, variables x and y are in memory locations $L_{19}$ and $L_{10}$ that are part of different memory access units, but are assigned to the same conflict set A and given the same key.

In this regard, a TM system according to an exemplary embodiment of the invention may executes the following step for the above exemplary transaction:
   tm read full x, key of {x, y}
   tm read lightweight y
where it is assumed that the "tm read lightweight" is a transaction read step that incurs less than the full overhead of a full transactional read (tm read) for the given programming environment and application. In one exemplary embodiment of the invention, as illustrated in FIG. 4A, the transactional access may take an additional parameter that indicates the key of the conflict set to which the accessed location belongs—i.e., denoted as key A {x,y . . . } in FIG. 4A. The reason that the access to the variable y does not need to incur the overhead of conflict detection is that x and y belong to the same conflict set and the previous access to variable x takes care of the conflict detection for accessing and reading y since any conflict with x's conflict set which includes y is guaranteed to be detected.

It is to be appreciated that the above example is merely illustrative of a conceptual process of reducing overhead costs for conflict detection in transactional memory accesses using customizable conflict sets based on logical key values. One of ordinary skill in the art will readily understand that the overhead associated with heavyweight and lightweight read and write operations (or read and write barriers) will vary depending on the TM system framework. As an example of the differences between full and lightweight transactional operations, consider a TM system that uses a metadata table to keep track of accesses to memory locations by transactions. In such TM system, a full transactional read of location x may include the steps of:
   (1) reading the metadata corresponding to the conflict set that includes x;
   (2) checking if the metadata was stable;
   (3) ensuring that the read of metadata precedes the read of location x (typically using slow fence instructions);
   (4) reading location x; and
   (5) logging the information read from the metadata (in order to check later that the metadata has not changed and thus x has not changed and remains consistent).

If the same transaction subsequently reads location y and it is not known whether x and y are in the same or different conflict set, then the transaction incurs these steps for location y. However, if x and y are in the same conflict set, then the transaction need only execute fewer and faster steps for reading location y, in this case just step (4) read location y. The transaction can safely skip steps (1), (2), (3), and (5), as both x and y are associated with the same metadata and the consistency of y is subsumed by the full steps taken to maintain the consistency of x.

Example 2

Consider two transactions, one executed by Thread 1 and the other by Thread 2.

Thread 1:

```
atomic {
    read x1;
    read y1;
}
```

Thread 2:

```
atomic {
    write x2;
    write y2;
}
```

In this example, it is assumed that for most transactions variables x1 and x2 are stored in memory locations are collocated and associated with the same memory access units (e.g., the same memory block or object) and that variables y1 and y2 are also stored in memory locations that are collocated and associated with the same memory access units (e.g., the same memory block or object). For example, as shown in the exemplary embodiment of FIG. 4B, variables x1 and x2 are stored in memory locations $L_{19}$ and $L_{17}$ which are part of a memory access unit U1 and variables y1 and y2 are stored in memory locations $L_{10}$ and $L_{12}$ which are part of a memory access unit U2. It is further assumed that variables x1 and y1 are not necessarily collocated, as shown in FIG. 4B.

In a conventional TM system, the two transactions would likely encounter false conflicts with each other when running concurrently due to two transactions accessing the same memory units $U_1$ and $U_2$. Such conflict would be false, however, since the data sets of the two transactions are disjoint (don't overlap) and concurrent access to the memory access units U1 and U2 would not result in error or conflict and should be allowed to execute. Another disadvantage is that in conventional TM systems, each of the accesses in the transactions would perform costly operations and incur the full overhead of a transactional access. In a conventional TM system, the steps executed by Threads 1 and 2 may be as follows:

Thread 1:
   tm read full x1
   tm read full y1

Thread 2:
   tm write full x2
   tm write full y2

Figure 4B:
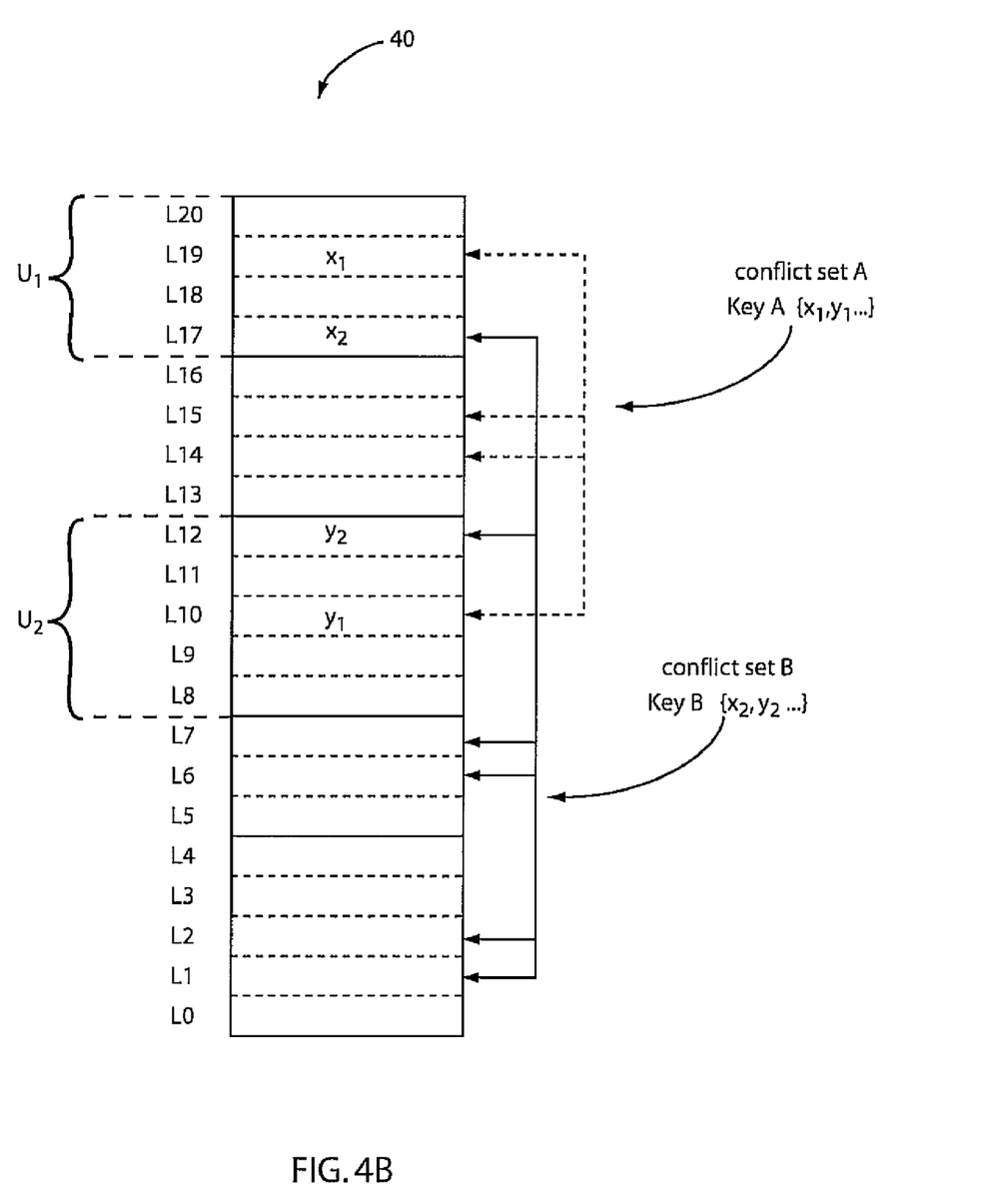

In accordance with an exemplary embodiment of the invention, the overhead associated with conflict detection in the example of FIG. 4B can be reduced using conflict sets to control access to the shared memory (40). Using the current invention, the compiler or the programmer (e.g., based on static analysis or profiling feedback), can assign the locations of the variables x1 and y1 in one conflict set A (designated by logical key value A) and assign the locations of variables x2 and y2 in conflict set B (designated by logical Key value B). In a TM system according to an exemplary embodiment of the invention, the steps executed by Threads 1 and 2 may be as follows:

Thread 1:
   tm read full x1, key of {x1, y1}
   tm read lightweight y1

Thread 2:
   tm write full x2, key of {x2, y2}
   tm write lightweight y2

In this exemplary embodiment, a transactional memory system according to an exemplary embodiment of the invention would allow the transactions of Threads 1 and 2 to execute uninterrupted in parallel because the two transactions do not overlap in data accesses to the shared memory access units $U_1$ and $U_2$. In this manner, the assignment of the variables in the different conflict sets as shown in FIG. 4B guarantees that the transactions will not conflict with each other as the different conflict sets indicates that the two threads concurrently access disjoint elements of the shared object or memory word. Moreover, the conflict sets in FIG. 4B allow safe elimination of redundant TM read and operations where the transactional read and write overheads are reduced or eliminated in FIG. 4B for those reasons discussed herein.

Figure 5:
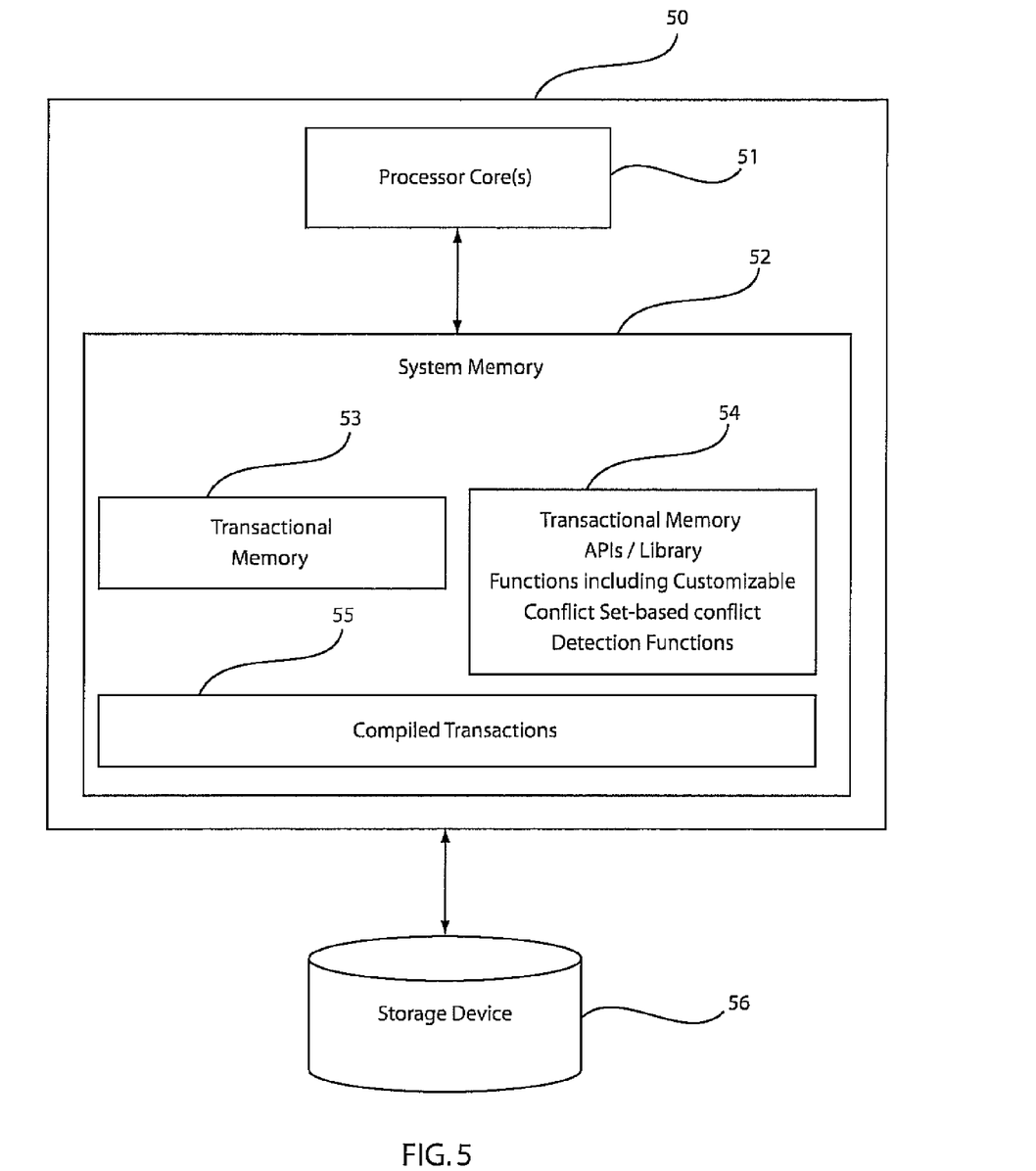
FIG. 5 is a schematic diagram of a computing system for implementing a transactional memory system with key-based transactional memory conflict detection, according to an exemplary embodiment of the invention.

FIG. 5 is a block diagram of a computer processing system to which the present invention may be applied according to an embodiment of the present invention. FIG. 5 depicts a host computing system (50) comprising one or more processors (51) and system memory (52) having shared data and objects stored in transactional memory (53) and stored program instructions that are executable to implement the functionality of a transactional memory system manager (54) and a plurality of compiled transactions (55) for one or more multithreaded applications. The host system (50) may be coupled to a storage device (56). The program memory associated with the transaction memory manager (54) and thread transactions (55) may be persistently stored in the storage device (56) and compiled and loaded into the system memory (52) for execution by the CPU (51). A thread is the entity that receives control of the CPU (51).

In various embodiments, transactions (55) may be included within threads or processes that may implement any type of individual or standalone application (e.g., a database application), an instance or component of a distributed application, etc. The system memory (52) may be implemented using any appropriate medium such as any of various types of RAM (e.g., DRAM, SDRAM, RDRAM, SRAM, etc.). The storage device (56) may include any suitable type of persistent and/or volatile storage devices, such as individual disks, disk arrays, optical devices such as CD-ROMs, CD-RW drives, DVD-ROMs, DVD-RW drives, flash memory devices, various types of RAM and the like.

The transactional memory manager (54) is configured to coordinate memory access requests directed at data and objects within a transactional memory (53) from a plurality of transactions (55). Any number and amount of shared data and objects may reside in the memory (53) managed by transaction memory system manager (54) at any given time. Each transaction (55) may comprise a plurality of memory accesses (e.g., accesses identifying memory locations at the level of programming language constructs) as well as other computations. Transactional memory manager (54) includes various APIs and library functions for implementing control for concurrent accesses to shared memory (53) by transactions (55). In accordance with exemplary embodiments of the invention, the TM manager (54) implements functions for conflict detection to resolve some types of conflicts between transactions (55) using conflict sets.

For example, the transactional memory manager (54) may be configured to provide a low-level application programming interface (API) to support coordination of accesses to shared data using conflict evaluation and detection based on customizable conflict sets that are associated with transactions, as well as other methods and interfaces that are part of the TM system to allow, e.g., programmatic initiation of a transaction (55) and programmatic committing of a transaction (55), etc.

In accordance with exemplary embodiments of the invention, various APIs, methods, etc. are included to support conflict detection with conflict set granularities that are arbitrarily customizable to match program access patterns of transactions for enabling low-overhead conflict detection, as discussed above. In one exemplary embodiment of the invention as discussed above, the transactional memory system (54) can logically group a plurality of memory locations into conflict sets that arbitrarily sized and may include groups of non-contiguous memory locations by associating a unique logical key value with each memory location that may be accessed by a transaction. The key values may be selected by the programmer or a compiler at run-time to indicate that locations with the same key value are bundled in the same conflict set. This enables the avoidance of unnecessary overheads and false conflicts In another exemplary embodiment, instead of passing a logical key (which is associated with a conflict set) as an additional argument to calls to transactional read and write operations, a key table can be used to keep track of associations of memory locations with conflict set keys, such that in the course of a transactional read or write operations the key table is checked and conflict set associations are determined.

For example, if locations x and y are intended to be in the same conflict set, then the entries in the key table corresponding to locations x and y can be set to the same key.

It is to be understood that the systems and methods described herein may be implemented in various forms of hardware, software, firmware, special purpose processors, or a combination thereof. For example, exemplary systems and methods can be implemented in software as an application comprising program instructions that are tangibly embodied on one or more program storage devices (e.g., hard disk, magnetic floppy disk, RAM, CD ROM, ROM and Flash memory) and executable by any device or machine comprising suitable architecture. It is to be further understood that since the constituent system modules and method steps depicted in the accompanying Figures may be implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computing system, comprising:
   a shared memory comprising a plurality of memory locations to store data that is shared among a plurality of threads; and
   a transactional memory system to control and coordinate concurrent access to the shared data in the memory by one or more of the plurality of threads when executing concurrent transactions;
   wherein the transactional memory system implements conflict detection at a variable granularity through customized conflict sets for transactions, wherein the customized conflict set for a given transaction includes a logical grouping of one or more memory locations in the shared memory that contain data to be accessed within the transaction.

2. The computing system of claim 1, wherein a conflict set for a given transaction is specified by program level constructs.

3. The computing system of claim 1, wherein a conflict set for a given transaction is dynamically determined during runtime by a compiler based on anticipated access patterns of the transaction.

4. The computing system of claim 1, wherein a conflict set for a given transaction is specified by associating a logical key value to each memory location in the shared memory that may be accessed within the given transaction.

5. The computing system of claim 1, wherein a conflict set for a given transaction is dynamically specified to include memory locations in the shared memory that include variables to be accessed within the given transaction at a given time.

6. The computing system of claim 1, wherein a conflict set for a given transaction includes non-contiguous memory locations in the shared memory.

7. The computing system of claim 1, wherein a conflict set for a given transaction includes memory locations associated with two or more memory access units.

8. The computing system of claim 1, wherein a unique logical key is associated with each conflict set.

9. The computing system of claim 8, wherein the unique logical key for a given conflict set is determined based on an address of a memory location included in the conflict set.

10. The computing system of claim 8, wherein the unique logical key is passed as a parameter during initiation of a transactional memory access operation.

11. The computing system of claim 1, wherein for a transaction with more than one access to memory locations of a conflict set, conflict detection is performed for only one access operation and not performed for remaining access operations within the transaction.

12. The computing system of claim 1, wherein multiple threads may concurrently access disjoint elements of a shared object when the memory accesses involve non overlapping data accesses as determined based on the conflict sets associated with the each of concurrent executing transactions.

13. A method for implementing key-based transaction memory conflict detection, comprising:
   providing a shared memory comprising a plurality of memory locations which store data items that are shared among a plurality of threads;
   assigning first and second memory locations of the shared memory to a same conflict set, wherein the first and second memory locations store first and second data items, respectively, which are part of different memory access units; and
   executing an atomic transaction by one of the plurality of threads, wherein the atomic transaction comprises operations for accessing the first and second data items stored in the first and second memory locations, respectively, wherein executing the atomic transaction comprises:
      determining that the first and second memory locations are included in the same conflict set; and
      performing only one conflict detection process during execution of the atomic transaction to access both the first and second memory locations.

14. The method of claim 13, wherein determining that the first and second memory locations are included in the same conflict set comprises:
   passing a key value associated with a conflict set as an argument to a call to a transactional access to the first memory location; and
   determining whether the first and second memory locations are designated as part of the same conflict set based on the key value.

15. The method of claim 13, wherein assigning first and second memory locations of the shared memory to a same conflict set is specified by program level constructs.

16. The method of claim 13, wherein assigning first and second memory locations of the shared memory to a same conflict set is dynamically performed during runtime by a compiler based on anticipated memory access patterns of the atomic transaction.

17. The method of claim 13, wherein assigning first and second memory locations of the shared memory to a same conflict set is performed by associating a logical key value to each memory location in the shared memory that may be accessed within the atomic transaction.

18. The method of claim 13, wherein assigning first and second memory locations of the shared memory to a same conflict set is performed dynamically by including within the same conflict set those memory locations in the shared memory that include variables to be accessed by the atomic transaction at a given time.

19. The method of claim 13, wherein a unique logical key is associated with each conflict set.

20. The method of claim 19, wherein the unique logical key for a given conflict set is determined based on an address of a memory location included in the conflict set.

21. A program storage device readable by computer, tangibly embodying a program of instructions executable by the computer to perform method steps for implementing key-based transaction memory conflict detection, the method steps comprising:
   providing a shared memory comprising a plurality of memory locations which store data items that are shared among a plurality of threads;
   assigning first and second memory locations of the shared memory to a same conflict set, wherein the first and second memory locations store first and second data items, respectively, which are part of different memory access units; and
   executing an atomic transaction by one of the plurality of threads, wherein the atomic transaction comprises operations for accessing the first and second data items stored in the first and second memory locations, respectively, wherein executing the atomic transaction comprises:
      determining that the first and second memory locations are included in the same conflict set; and
      performing only one conflict detection process during execution of the atomic transaction to access both the first and second memory locations.

22. A method for controlling concurrent access by multiple threads to a shared memory, comprising;
   initiating a first atomic transaction by a first thread, wherein the first atomic transaction includes two or more memory access operations to memory locations within a shared memory;
   determining a conflict set associated with the first atomic transaction, the conflict set including a group of memory locations associated with the memory access operations within the first atomic transaction; and
   performing conflict detection process using the conflict set of the first atomic transaction to determine if a conflict exists between the first thread and a second thread with respect to performing the memory access operations within the first atomic transaction.

23. A program storage device readable by computer, tangibly embodying a program of instructions executable by the computer to perform the method steps recited in claim 22.

* * * * *